United States Patent
Han

(10) Patent No.: US 12,509,496 B2
(45) Date of Patent: Dec. 30, 2025

(54) GLP-1/GLUCAGON DUAL AGONIST FUSION PROTEIN

(71) Applicant: Shanghai Minwei Biotechnology Co., LTD, Shanghai (CN)

(72) Inventor: Weiyue Han, Guangdong (CN)

(73) Assignee: Shanghai Minwei Biotechnology Co., LTD, Shanghai (CN)

(*) Notice: Subject to any disclaimer, the term of this patent is extended or adjusted under 35 U.S.C. 154(b) by 613 days.

(21) Appl. No.: 18/005,898

(22) PCT Filed: May 28, 2021

(86) PCT No.: PCT/CN2021/096773
§ 371 (c)(1),
(2) Date: Jan. 18, 2023

(87) PCT Pub. No.: WO2021/239116
PCT Pub. Date: Dec. 2, 2021

(65) Prior Publication Data
US 2023/0322887 A1 Oct. 12, 2023

(30) Foreign Application Priority Data

May 29, 2020 (CN) .......................... 202010479520.0
Apr. 1, 2021 (CN) .......................... 202110354251.X

(51) Int. Cl.
*C07K 14/605* (2006.01)
*A61P 3/04* (2006.01)
*C12N 15/63* (2006.01)

(52) U.S. Cl.
CPC .............. *C07K 14/605* (2013.01); *A61P 3/04* (2018.01); *C12N 15/63* (2013.01); *C07K 2319/02* (2013.01); *C07K 2319/30* (2013.01)

(58) Field of Classification Search
None
See application file for complete search history.

(56) References Cited

FOREIGN PATENT DOCUMENTS

| | | |
|---|---|---|
| CN | 102766204 A | 11/2012 |
| CN | 104039822 A | 9/2014 |
| CN | 107106660 A | 8/2017 |
| CN | 107106680 A | 8/2017 |
| CN | 109280083 A | 1/2019 |
| CN | 109836488 A | 6/2019 |
| CN | 110028587 A | 7/2019 |
| CN | 111040022 A | 4/2020 |
| WO | 2010148089 A1 | 12/2010 |
| WO | 2019101042 A1 | 5/2019 |

OTHER PUBLICATIONS

Sanchez-Garrido, Miguel A et al.; "GLP-1/glucagon receptor co-agonism for treatment of obesity"; Diabetologia; Jul. 21, 2017, vol. 60(10), 1851-1861, pp. 1-11.
Lu, Lian et al.; "In vitro and in vivo characterization of a novel long-acting GLP-1 receptor agonist, exendin-4-Fc fusion protein"; RSC Advances; 2017, vol. 7, pp. 54178-54187.
Knerr, Patrick J et al.; "Selection and progression of unimolecular agonists at the GIP, GLP-1, and glucagon receptors as drug candidates"; Peptides; Nov. 27, 2019, vol. 125:170225, pp. 1-26.
Jonathan, W Day et al.; "Optimization of Co-Agonism at GLP-1 and Glucagon Receptors to Safely Maximize Weight Reduction in DIO-Rodents"; Peptide Science; Apr. 14, 2012, vol. 98, No. 5, pp. 443-450.

*Primary Examiner* — Kevin S Orwig
(74) *Attorney, Agent, or Firm* — NKL Law; Bin Lu; Allen Xue

(57) ABSTRACT

The present invention provides a GLP-1/glucagon dual agonist and an application thereof. Specifically, the present invention provides a GLP-1 mutation protein, and the GLP-1 mutation protein simultaneously has the activity of binding and activating a class B G protein-coupled receptor GLP-1R, and the activity of a glucagon receptor. By applying a compound, calorie consumption can be increased by means of glucagon activity so as to effectively reduce a body weight, thereby relieving or preventing obesity-related diseases or other metabolic diseases.

9 Claims, 7 Drawing Sheets

Specification includes a Sequence Listing.

SEQUENCE LISTING

<160> NUMBER OF SEQ ID NOS: 14

<210> SEQ ID NO 1
<211> LENGTH: 39
<212> TYPE: PRT
<213> ORGANISM: Artificial Sequence
<220> FEATURE:
<223> OTHER INFORMATION: synthesized
<220> FEATURE:
<221> NAME/KEY: misc_feature

```
<223> OTHER INFORMATION: Peptide Design Template
<220> FEATURE:
<221> NAME/KEY: misc_feature
<222> LOCATION: (2)..(2)
<223> OTHER INFORMATION: X = Gly or Ser
<220> FEATURE:
<221> NAME/KEY: misc_feature
<222> LOCATION: (10)..(10)
<223> OTHER INFORMATION: X = Leu or Tyr
<220> FEATURE:
<221> NAME/KEY: misc_feature
<222> LOCATION: (18)..(18)
<223> OTHER INFORMATION: X = Arg or Ala
<220> FEATURE:
<221> NAME/KEY: misc_feature
<222> LOCATION: (20)..(20)
<223> OTHER INFORMATION: X = Lys or Gln
<220> FEATURE:
<221> NAME/KEY: misc_feature
<222> LOCATION: (21)..(21)
<223> OTHER INFORMATION: X = Glu or Asp
<220> FEATURE:
<221> NAME/KEY: misc_feature
<222> LOCATION: (23)..(23)
<223> OTHER INFORMATION: X = Ile or Val
<220> FEATURE:
<221> NAME/KEY: misc_feature
<222> LOCATION: (24)..(24)
<223> OTHER INFORMATION: X = Ala or Gln

<400> SEQUENCE: 1

His Xaa Gln Gly Thr Phe Thr Ser Asp Xaa Ser Lys Tyr Leu Asp Glu
1               5                   10                  15

Gln Xaa Ala Xaa Xaa Phe Xaa Xaa Trp Leu Ile Ala Gly Gly Pro Ser
            20                  25                  30

Ser Gly Ala Pro Pro Pro Ser
            35

<210> SEQ ID NO 2
<211> LENGTH: 19
<212> TYPE: PRT
<213> ORGANISM: Artificial Sequence
<220> FEATURE:
<223> OTHER INFORMATION: synthesized
<220> FEATURE:
<221> NAME/KEY: misc_feature
<223> OTHER INFORMATION: Signal Peptide

<400> SEQUENCE: 2

Met Glu Leu Gly Leu Arg Trp Val Phe Leu Val Ala Ile Leu Glu Gly
1               5                   10                  15

Val Gln Cys

<210> SEQ ID NO 3
<211> LENGTH: 39
<212> TYPE: PRT
<213> ORGANISM: Artificial Sequence
<220> FEATURE:
<223> OTHER INFORMATION: synthesized
<220> FEATURE:
<221> NAME/KEY: misc_feature
<223> OTHER INFORMATION: GLP-1/Glucagon Dual Agonist

<400> SEQUENCE: 3

His Gly Gln Gly Thr Phe Thr Ser Asp Leu Ser Lys Tyr Leu Asp Glu
1               5                   10                  15

Gln Arg Ala Lys Glu Phe Ile Ala Trp Leu Ile Ala Gly Gly Pro Ser
            20                  25                  30
```

Ser Gly Ala Pro Pro Pro Ser
        35

<210> SEQ ID NO 4
<211> LENGTH: 174
<212> TYPE: DNA
<213> ORGANISM: Artificial Sequence
<220> FEATURE:
<223> OTHER INFORMATION: synthesized
<220> FEATURE:
<221> NAME/KEY: misc_feature
<223> OTHER INFORMATION: Nucleotide Sequence Encoding Signal Peptide and
      GLP-1/Glucagon Dual Agonist

<400> SEQUENCE: 4
atggagctgg gcctgaggtg ggtgttcctg gtggccatcc tggagggcgt gcagtgccac      60
ggccagggca ccttcaccag cgacctgagc aagtacctgg acgagcagag ggccaaggag     120
ttcatcgcct ggctgatcgc cggcggcccc agcagcggcg cccccccccc cagc           174

<210> SEQ ID NO 5
<211> LENGTH: 33
<212> TYPE: DNA
<213> ORGANISM: Artificial Sequence
<220> FEATURE:
<223> OTHER INFORMATION: synthesized
<220> FEATURE:
<221> NAME/KEY: misc_feature
<223> OTHER INFORMATION: Primer

<400> SEQUENCE: 5
gacgagcagr sggccmagga sttcrthsmc tgg                                   33

<210> SEQ ID NO 6
<211> LENGTH: 42
<212> TYPE: DNA
<213> ORGANISM: Artificial Sequence
<220> FEATURE:
<223> OTHER INFORMATION: synthesized
<220> FEATURE:
<221> NAME/KEY: misc_feature
<223> OTHER INFORMATION: Primer

<400> SEQUENCE: 6
caggtacttg ctawrgtcgc tggtgaaggt gccctgtysg tg                         42

<210> SEQ ID NO 7
<211> LENGTH: 39
<212> TYPE: PRT
<213> ORGANISM: Artificial Sequence
<220> FEATURE:
<223> OTHER INFORMATION: synthesized
<220> FEATURE:
<221> NAME/KEY: misc_feature
<223> OTHER INFORMATION: 3D9

<400> SEQUENCE: 7

His Ser Gln Gly Thr Phe Thr Ser Asp Tyr Ser Lys Tyr Leu Asp Glu
1               5                   10                  15

Gln Ala Ala Lys Glu Phe Ile Ala Trp Leu Ile Ala Gly Gly Pro Ser
            20                  25                  30

Ser Gly Ala Pro Pro Pro Ser
        35

<210> SEQ ID NO 8
<211> LENGTH: 39

```
<212> TYPE: PRT
<213> ORGANISM: Artificial Sequence
<220> FEATURE:
<223> OTHER INFORMATION: synthesized
<220> FEATURE:
<221> NAME/KEY: misc_feature
<223> OTHER INFORMATION: 6B7

<400> SEQUENCE: 8

His Ser Gln Gly Thr Phe Thr Ser Asp Tyr Ser Lys Tyr Leu Asp Glu
1               5                   10                  15

Gln Arg Ala Lys Asp Phe Ile Ala Trp Leu Ile Ala Gly Gly Pro Ser
            20                  25                  30

Ser Gly Ala Pro Pro Ser
        35

<210> SEQ ID NO 9
<211> LENGTH: 39
<212> TYPE: PRT
<213> ORGANISM: Artificial Sequence
<220> FEATURE:
<223> OTHER INFORMATION: synthesized
<220> FEATURE:
<221> NAME/KEY: misc_feature
<223> OTHER INFORMATION: 12C6

<400> SEQUENCE: 9

His Ser Gln Gly Thr Phe Thr Ser Asp Tyr Ser Lys Tyr Leu Asp Glu
1               5                   10                  15

Gln Arg Ala Lys Glu Phe Val Ala Trp Leu Ile Ala Gly Gly Pro Ser
            20                  25                  30

Ser Gly Ala Pro Pro Ser
        35

<210> SEQ ID NO 10
<211> LENGTH: 17
<212> TYPE: PRT
<213> ORGANISM: Artificial Sequence
<220> FEATURE:
<223> OTHER INFORMATION: synthesized
<220> FEATURE:
<221> NAME/KEY: misc_feature
<223> OTHER INFORMATION: Linker Sequence

<400> SEQUENCE: 10

Gly Gly Gly Gly Gly Ser Gly Gly Gly Ser Gly Gly Gly Gly Ser
1               5                   10                  15

Ala

<210> SEQ ID NO 11
<211> LENGTH: 228
<212> TYPE: PRT
<213> ORGANISM: Homo sapiens

<400> SEQUENCE: 11

Glu Ser Lys Tyr Gly Pro Pro Cys Pro Pro Cys Pro Ala Pro Glu Ala
1               5                   10                  15

Ala Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60
```

-continued

Glu Val His Asn Ala Lys Thr Lys Pro Arg Glu Glu Gln Phe Asn Ser
65                  70                  75                  80

Thr Tyr Arg Val Val Ser Val Leu Thr Val Leu His Gln Asp Trp Leu
            85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
            165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly
225

<210> SEQ ID NO 12
<211> LENGTH: 284
<212> TYPE: PRT
<213> ORGANISM: Artificial Sequence
<220> FEATURE:
<223> OTHER INFORMATION: synthesized
<220> FEATURE:
<221> NAME/KEY: misc_feature
<223> OTHER INFORMATION: Fc Fusion Protein 1

<400> SEQUENCE: 12

His Ser Gln Gly Thr Phe Thr Ser Asp Tyr Ser Lys Tyr Leu Asp Glu
1               5                   10                  15

Gln Ala Ala Lys Glu Phe Ile Ala Trp Leu Ile Ala Gly Gly Pro Ser
            20                  25                  30

Ser Gly Ala Pro Pro Pro Ser Gly Gly Gly Gly Ser Gly Gly Gly Gly
        35                  40                  45

Gly Ser Gly Gly Gly Gly Ser Ala Glu Ser Lys Tyr Gly Pro Pro Cys
    50                  55                  60

Pro Pro Cys Pro Ala Pro Glu Ala Ala Gly Gly Pro Ser Val Phe Leu
65                  70                  75                  80

Phe Pro Pro Lys Pro Lys Asp Thr Leu Met Ile Ser Arg Thr Pro Glu
            85                  90                  95

Val Thr Cys Val Val Val Asp Val Ser Gln Glu Asp Pro Glu Val Gln
            100                 105                 110

Phe Asn Trp Tyr Val Asp Gly Val Glu Val His Asn Ala Lys Thr Lys
        115                 120                 125

Pro Arg Glu Glu Gln Phe Asn Ser Thr Tyr Arg Val Val Ser Val Leu
    130                 135                 140

Thr Val Leu His Gln Asp Trp Leu Asn Gly Lys Glu Tyr Lys Cys Lys
145                 150                 155                 160

Val Ser Asn Lys Gly Leu Pro Ser Ser Ile Glu Lys Thr Ile Ser Lys
            165                 170                 175

Ala Lys Gly Gln Pro Arg Glu Pro Gln Val Tyr Thr Leu Pro Pro Ser
            180                 185                 190

Gln Glu Glu Met Thr Lys Asn Gln Val Ser Leu Thr Cys Leu Val Lys
            195                 200                 205

Gly Phe Tyr Pro Ser Asp Ile Ala Val Glu Trp Glu Ser Asn Gly Gln
            210                 215                 220

Pro Glu Asn Asn Tyr Lys Thr Thr Pro Val Leu Asp Ser Asp Gly
225                 230                 235                 240

Ser Phe Phe Leu Tyr Ser Arg Leu Thr Val Asp Lys Ser Arg Trp Gln
                245                 250                 255

Glu Gly Asn Val Phe Ser Cys Ser Val Met His Glu Ala Leu His Asn
                260                 265                 270

His Tyr Thr Gln Lys Ser Leu Ser Leu Ser Leu Gly
            275                 280

<210> SEQ ID NO 13
<211> LENGTH: 284
<212> TYPE: PRT
<213> ORGANISM: Artificial Sequence
<220> FEATURE:
<223> OTHER INFORMATION: synthesized
<220> FEATURE:
<221> NAME/KEY: misc_feature
<223> OTHER INFORMATION: Fc Fusion Protein 2

<400> SEQUENCE: 13

His Ser Gln Gly Thr Phe Thr Ser Asp Tyr Ser Lys Tyr Leu Asp Glu
1               5                   10                  15

Gln Arg Ala Lys Asp Phe Ile Ala Trp Leu Ile Ala Gly Gly Pro Ser
            20                  25                  30

Ser Gly Ala Pro Pro Pro Ser Gly Gly Gly Gly Ser Gly Gly Gly
            35                  40                  45

Gly Ser Gly Gly Gly Gly Ser Ala Glu Ser Lys Tyr Gly Pro Pro Cys
        50                  55                  60

Pro Pro Cys Pro Ala Pro Glu Ala Ala Gly Gly Pro Ser Val Phe Leu
65                  70                  75                  80

Phe Pro Pro Lys Pro Lys Asp Thr Leu Met Ile Ser Arg Thr Pro Glu
                85                  90                  95

Val Thr Cys Val Val Val Asp Val Ser Gln Glu Asp Pro Glu Val Gln
            100                 105                 110

Phe Asn Trp Tyr Val Asp Gly Val Glu Val His Asn Ala Lys Thr Lys
            115                 120                 125

Pro Arg Glu Glu Gln Phe Asn Ser Thr Tyr Arg Val Val Ser Val Leu
            130                 135                 140

Thr Val Leu His Gln Asp Trp Leu Asn Gly Lys Glu Tyr Lys Cys Lys
145                 150                 155                 160

Val Ser Asn Lys Gly Leu Pro Ser Ser Ile Glu Lys Thr Ile Ser Lys
                165                 170                 175

Ala Lys Gly Gln Pro Arg Glu Pro Gln Val Tyr Thr Leu Pro Pro Ser
            180                 185                 190

Gln Glu Glu Met Thr Lys Asn Gln Val Ser Leu Thr Cys Leu Val Lys
            195                 200                 205

Gly Phe Tyr Pro Ser Asp Ile Ala Val Glu Trp Glu Ser Asn Gly Gln
            210                 215                 220

Pro Glu Asn Asn Tyr Lys Thr Thr Pro Val Leu Asp Ser Asp Gly
225                 230                 235                 240

```
Ser Phe Phe Leu Tyr Ser Arg Leu Thr Val Asp Lys Ser Arg Trp Gln
                245                 250                 255

Glu Gly Asn Val Phe Ser Cys Ser Val Met His Glu Ala Leu His Asn
            260                 265                 270

His Tyr Thr Gln Lys Ser Leu Ser Leu Ser Leu Gly
        275                 280

<210> SEQ ID NO 14
<211> LENGTH: 284
<212> TYPE: PRT
<213> ORGANISM: Artificial Sequence
<220> FEATURE:
<223> OTHER INFORMATION: synthesized
<220> FEATURE:
<221> NAME/KEY: misc_feature
<223> OTHER INFORMATION: Fc Fusion Protein 3

<400> SEQUENCE: 14

His Ser Gln Gly Thr Phe Thr Ser Asp Tyr Ser Lys Tyr Leu Asp Glu
1               5                   10                  15

Gln Arg Ala Lys Glu Phe Val Ala Trp Leu Ile Ala Gly Gly Pro Ser
            20                  25                  30

Ser Gly Ala Pro Pro Ser Gly Gly Gly Gly Ser Gly Gly Gly
        35                  40                  45

Gly Ser Gly Gly Gly Gly Ser Ala Glu Ser Lys Tyr Gly Pro Pro Cys
    50                  55                  60

Pro Pro Cys Pro Ala Pro Glu Ala Ala Gly Gly Pro Ser Val Phe Leu
65                  70                  75                  80

Phe Pro Pro Lys Pro Lys Asp Thr Leu Met Ile Ser Arg Thr Pro Glu
                85                  90                  95

Val Thr Cys Val Val Val Asp Val Ser Gln Glu Asp Pro Glu Val Gln
            100                 105                 110

Phe Asn Trp Tyr Val Asp Gly Val Glu Val His Asn Ala Lys Thr Lys
        115                 120                 125

Pro Arg Glu Glu Gln Phe Asn Ser Thr Tyr Arg Val Val Ser Val Leu
    130                 135                 140

Thr Val Leu His Gln Asp Trp Leu Asn Gly Lys Glu Tyr Lys Cys Lys
145                 150                 155                 160

Val Ser Asn Lys Gly Leu Pro Ser Ser Ile Glu Lys Thr Ile Ser Lys
                165                 170                 175

Ala Lys Gly Gln Pro Arg Glu Pro Gln Val Tyr Thr Leu Pro Pro Ser
            180                 185                 190

Gln Glu Glu Met Thr Lys Asn Gln Val Ser Leu Thr Cys Leu Val Lys
        195                 200                 205

Gly Phe Tyr Pro Ser Asp Ile Ala Val Glu Trp Glu Ser Asn Gly Gln
    210                 215                 220

Pro Glu Asn Asn Tyr Lys Thr Thr Pro Pro Val Leu Asp Ser Asp Gly
225                 230                 235                 240

Ser Phe Phe Leu Tyr Ser Arg Leu Thr Val Asp Lys Ser Arg Trp Gln
                245                 250                 255

Glu Gly Asn Val Phe Ser Cys Ser Val Met His Glu Ala Leu His Asn
            260                 265                 270

His Tyr Thr Gln Lys Ser Leu Ser Leu Ser Leu Gly
        275                 280
```

GLP-1/GLUCAGON DUAL AGONIST FUSION PROTEIN

INCORPORATION OF SEQUENCE LISTING

This application contains a sequence listing submitted in Computer Readable Form (CRF). The CFR file contains the sequence listing entitled "PBA408-0104 ST25.txt", which was created on Jun. 21, 2023, and is 14,648 bytes in size. The information in the sequence listing is incorporated herein by reference in its entirety.

TECHNICAL FIELD

The present invention belongs to the field of biotechnology or biomedicine, and specifically relates to a GLP-1 (Glucagon-like peptide)/glucagon dual agonist fusion protein.

BACKGROUND

Obesity refers to excessive total body fat content and/or increased local content and abnormal distribution, which is a chronic metabolic disease caused by a combination of genetic and environmental factors. Obesity mainly includes three characteristics: increased number of fat cells, imbalance of body fat distribution, and local fat deposition. Obesity is a major and growing health problem all over the world, and is related to many life threatening diseases such as cardiovascular disease, kidney disease, hypertension, stroke, infertility, respiratory dysfunction and type 2 diabetes.

At present, the main drugs approved by the US FDA to treat obesity include 17-(cyclopropylmethyl)-4,5-epoxy-3,14-dihydroxymorphinan-6-one (naltrexone)/bupropion, lorcaserin, phentermine/topiramate, orlistat, liraglutide, mazindol (withdrawn from the market) and methamphetatninehydrochloride (withdrawn from the market). Phentermine/topiramate (Qsymia®) is a compound preparation for weight loss approved by the FDA in 2012, which is used for people with a BMI of 30 kg/m$^2$ and above, and people with a BMI of 27 kg/m$^2$ and with one or more obesity-related diseases (such as high blood pressure, type 2 diabetes, and dyslipidemia). Lorcaserin hydrochloride is a 5-hydroxytryptamine 5-HT2C agonist, developed by Arena and first marketed in the United States in June 2013, for the treatment of obesity, but the potential risks of lorcaserin outweigh its benefits. Mazindol is a sympathomimetic amine, which was first marketed in the United States by Novartis in 1973 as a short-term appetite suppressant for obesity. However, due to commercial reasons, the product was withdrawn from the market in 2002. GLP-1 receptor agonists were first marketed as type 2 diabetes drugs, which bring good weight loss effect while controlling blood glucose. Liraglutide was marketed as a diabetes drug, which can reduce weight by 5%, and the FDA has approved it for the treatment of obesity. Currently, semaglutide and dulaglutide have been used for the treatment of obesity in phase 3 clinical trials. GLP-1 receptor agonists are promising weight loss drugs.

Although GLP-1 receptor agonists currently have good weight loss effects, in specific clinical applications, their effectiveness in reducing weight in obese patients still cannot meet clinical needs.

Therefore, there is an urgent need in this field to develop a medicament that can significantly control the weight of a patient.

SUMMARY OF THE INVENTION

The purpose of the present invention is to provide a medicament that can significantly control the weight of a patient.

Another purpose of the present invention is to provide a glucagon-like peptide-1 (GLP-1) analog Fc fusion protein with the application in the manufacture of a weight loss drug with a long-acting glucagon-like peptide-1 (GLP-1) and glucagon (GCG) dual agonist.

In the first aspect of the present invention, it provides a glucagon-like peptide-1 (GLP-1) mutant protein, wherein the amino acid sequence of the GLP-1 mutant protein is based on the amino acid sequence shown in SEQ ID NO: 1 and the amino acid residues at positions 2, 10, 18, 20, 21, 23, and/or 24 are selected from the group consisting of:

Gly or Ser at position 2,
Leu or Tyr at position 10,
Arg or Ala at position 18,
Lys or Gln at position 20,
Glu or Asp at position 21,
Ile or Val at position 23, and
Ala or Gln at position 24;
and wherein the GLP-1 mutant protein has both of the activity of binding and activating a class B G protein-coupled receptor GLP-1R, and the activity of binding a glucagon receptor.

In another preferred embodiment, the amino acid sequence of the GLP-1 mutant protein is shown in any one of SEQ ID NOs: 7, 8, and 9.

In another preferred embodiment, the amino acid sequence of the GLP-1 mutant protein is shown in SEQ ID NO: 7.

In another preferred embodiment, the amino acid sequence of the GLP-1 mutant protein is identical or substantially identical to that shown in SEQ ID NO: 3, except for the mutations (such as amino acid residues at positions 2, 10, 18, 20, 21, 23, and/or 24).

In another preferred embodiment, the "substantially identical" means that at most 10 amino acids (preferably 1-8, more preferably 1-10, more preferably 1-5) are different, wherein the differences comprise the substitution, deletion, or addition of amino acids, and the mutant protein still has both of the activity of binding and activating a class B G protein-coupled receptor GLP-1R, and the activity of binding a glucagon receptor.

In another preferred embodiment, the GLP-1 mutant protein can be modified or unmodified.

In another preferred embodiment, the GLP-1 mutant protein is modified by a liraglutide side chain which is Nα-Palmitoyl-L-glutamic acid-γ-succinimidyl-A-tert-butyl ester (Pal-Glu-(OSu)-OtBu).

In another preferred embodiment, the structure of the liraglutide side chain is shown as follows:

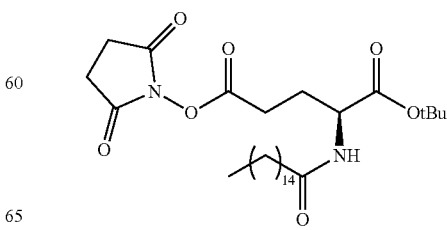

In another preferred embodiment, Lys in the GLP-1 mutant protein at position 12 or 20 corresponding to the sequence shown in SEQ ID NO: 7 is modified by the liraglutide side chain.

In the second aspect of the present invention, it provides a fusion protein, wherein the fusion protein has a structure as shown in formula II from N-terminus to C-terminus, A-B-C-D    (formula II)

wherein,

A is absent or a signal peptide;
B is the GLP-1 mutant protein according to the first aspect of the present invention;
C is a linker peptide;
D is a Fc fragment;
"-" is a peptide bond.

In another preferred embodiment, the amino acid sequence of the linker peptide is $(G_4S)_nA$ or a variant thereof, wherein n is a positive integer (for example, 1, 2, 3, 4, 5 or 6), preferably, n=3.

In another preferred embodiment, the variant of $(G_4S)_n$ comprises: a variant of the $(G_4S)_nA$ linker sequence obtained by substituting amino acids with similar or close properties in the sequence, for example, one or more S are respectively mutated into T; or 1-3 amino acids are inserted into the sequence.

In another preferred embodiment, the amino acid sequence of the linker sequence is shown in SEQ ID NO: 10.

In another preferred embodiment, the Fc fragment is an Fc fragment of immunoglobulin IgG, and wherein the IgG is selected from the group consisting of: IgG1, IgG2, and IgG4, preferably IgG4.

In another preferred embodiment, the Fc fragment comprises the hinge region, CH2 and CH3 domains of IgG4.

In another preferred embodiment, the amino acid sequence of the Fc fragment is shown in SEQ ID NO: 11.

In another preferred embodiment, the fusion protein has an amino acid sequence selected from the group consisting of:
  (a) a sequence shown in SEQ ID NO: 12, 13 or 14;
  (b) an amino acid sequence having at least 80%, preferably at least 85% or 90%, more preferably at least 95%, more preferably at least 98%, and more preferably at least 99% homology to the sequence shown in SEQ ID NO: 12, 13, or 14;
  and wherein the fusion protein has both of the activity of binding and activating a class B G protein-coupled receptor GLP-1R, and the activity of binding a glucagon receptor.

In another preferred embodiment, the amino acid sequence of the fusion protein is shown in SEQ ID NO: 12.

In the third aspect of the present invention, it provides an isolated polynucleotide encoding the GLP-1 mutant protein according to the first aspect of the present invention or the fusion protein according to the second aspect of the present invention.

In the fourth aspect of the present invention, it provides a vector comprising the polynucleotide according to the third aspect of the present invention.

In another preferred embodiment, the vector is selected from the group consisting of: DNA, RNA, plasmid, lentiviral vector, adenoviral vector, retroviral vector, transposon, and combinations thereof.

In the fifth aspect of the present invention, it provides a host cell which comprises the vector according to the fourth aspect of the present invention, or has the polynucleotide according to the third aspect of the present invention exogenously integrated into its genome, or expresses the GLP-1 mutant protein according to the first aspect of the present invention or the fusion protein according to the second aspect of the present invention.

In the sixth aspect of the present invention, it provides a method for preparing the GLP-1 mutant protein according to the first aspect of the present invention or the fusion protein according to the second aspect of the present invention, which comprises the following steps:
  (i) culturing the host cell according to the fifth aspect of the present invention under suitable conditions to obtain a mixture comprising the GLP-1 mutant protein according to the first aspect of the present invention or the fusion protein according to the second aspect of the present invention; and
  (ii) purifying and/or separating the mixture obtained in step (i), thereby obtaining the GLP-1 mutant protein according to the first aspect of the present invention or the fusion protein according to the second aspect of the present invention.

In another preferred embodiment, the method further comprises the following steps:
  (iii) subjecting the GLP-1 mutant protein according to the first aspect of the present invention or the fusion protein according to the second aspect of the present invention obtained in step (ii) to Boc modification;
  (iv) subjecting the Boc-modified GLP-1 mutant protein or fusion protein to Fmoc modification, thereby preparing a Fmoc and Boc-modified GLP-1 mutant protein or fusion protein;
  (v) subjecting the Fmoc and Boc-modified GLP-1 mutant protein or fusion protein to Boc deprotection, and making it react with the liraglutide side chain, thereby preparing a Fmoc-modified GLP-1 mutant protein or fusion protein; and
  (vi) subjecting the Fmoc-modified GLP-1 mutant protein according to the first aspect of the present invention or the fusion protein according to the second aspect of the present invention to Fmoc deprotection, thereby preparing a GLP-1 mutant protein or fusion protein with modification of the liraglutide side chain.

In another preferred embodiment, the amino acid at position 20 of the Boc-modified GLP-1 mutant protein or fusion protein is a protected lysine, and the protected lysine is Nε-(tert-butoxycarbonyl)-lysine.

In the seventh aspect of the present invention, it provides a pharmaceutical composition comprising:
  (I) the GLP-1 mutant protein according to the first aspect of the present invention, or the fusion protein according to the second aspect of the present invention; and
  (II) a pharmaceutically acceptable carrier.

In another preferred embodiment, the pharmaceutical composition further comprises other medicaments that can be used to prevent and/or treat obesity-related diseases.

In another preferred embodiment, the obesity-related diseases include: type I diabetes, type II diabetes, gestational diabetes, obesity, non-alcoholic steatohepatitis (NASH), and non-alcoholic fatty liver disease (NAFLD).

In the eighth aspect of the present invention, it provides use of the GLP-1 mutant protein according to the first aspect of the present invention or the fusion protein according to the second aspect of the present invention in the manufacture of a medicament for:
  (i) controlling the blood glucose content of a subject in need thereof;
  (ii) reducing the blood lipid content in vivo of a subject in need thereof;

(iii) reducing the body weight, or suppressing weight gain of a subject in need thereof; and/or (iv) reducing the liver fat content, or reducing the degree of liver fibrosis of a subject in need thereof.

In another preferred embodiment, the medicament is used for reducing the body weight, or suppressing weight gain of the subject in need thereof.

In another preferred embodiment, the medicament is used for preventing and/or treating obesity-related diseases.

In the ninth aspect of the present invention, it provides a method for preventing and/or treating obesity-related diseases, which comprises a step of administering an effective amount of the GLP-1 mutant protein according to the first aspect of the present invention, the fusion protein according to the second aspect of the present invention, or the pharmaceutical composition according to the seventh aspect of the present invention, to a subject in need thereof.

It should be understood that within the scope of the present invention, the above-mentioned technical features of the present invention and the technical features specifically described in the following (such as the embodiments) can be combined with each other to form a new or preferred technical solution, which are not redundantly repeated one by one due to space limitation.

DESCRIPTION OF DRAWINGS

FIG. 2 shows the effect of repeated administration of the test substance on the random body weight of DIO mice (Mean, n=6). Remarks: SC1 and SC2 indicate the first and second subcutaneous injection administration, and so on.

FIG. 3 shows the effect of repeated administration of the test substance on the percentage of random weight loss of DIO mice (Mean, n=6). Remarks: SC1 and SC2 indicate the first and second subcutaneous injection administration, and so on.

FIG. 4 shows the effect of repeated administration of the test substance and the control drug on the food intake of DIO mice. Remarks: D1 and D2 indicate the first day and the second day after the first administration, and so on.

MODES FOR CARRYING OUT THE INVENTION

Figure 1:
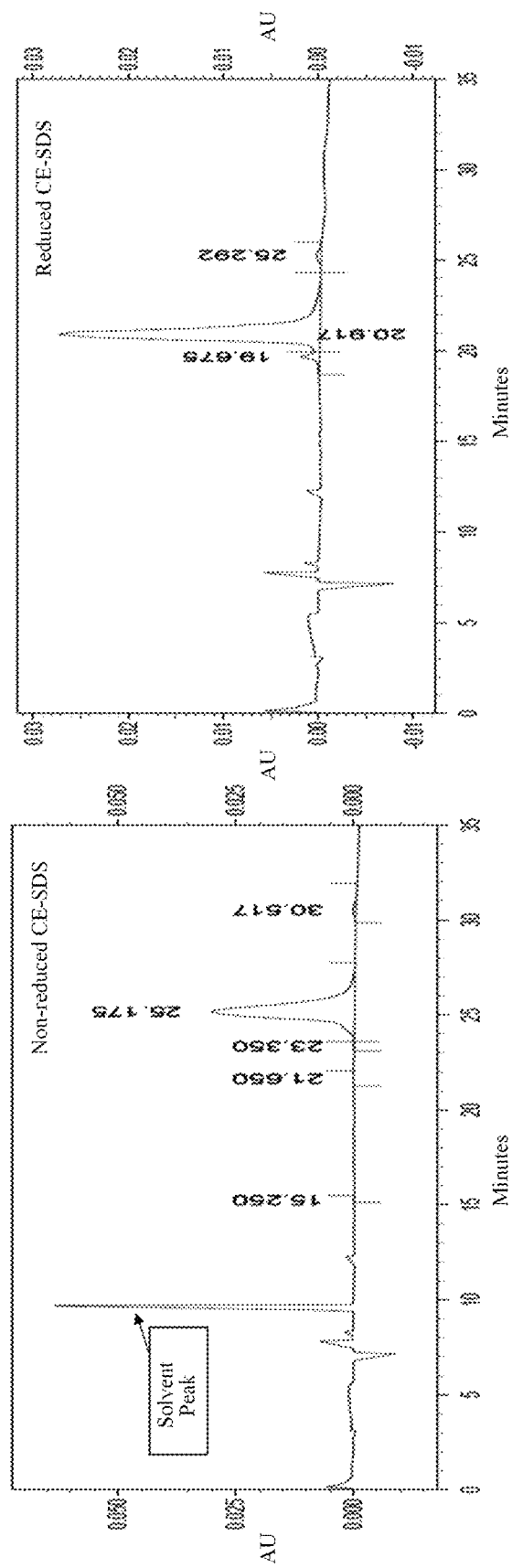
FIG. 1 shows the purity of the non-reduced sample and the reduced sample of the obtained fusion protein determined by capillary electrophoresis.

After extensive and intensive research and massive screening, the inventors have developed a GLP-1 variant and fusion protein with dual activities of GLP-1 and glucagon for the first time. Experimental results show that the mutant GLP-1 variant or fusion protein with the mutations of the present invention has both of the activity of binding and activating a class B G protein-coupled receptor GLP-1R, and the activity of binding a glucagon receptor. Therefore, the GLP-1 mutant protein and a fusion protein thereof of the present invention can effectively increase calorie consumption and reduce body weight, thereby effectively preventing and/or treating obesity-related diseases, such as type II diabetes, obesity, and non-alcoholic fatty liver, etc. On this basis, the inventors have completed the present invention.

Glucagon-Like Peptide-1 (GLP-1)

Glucagon-like peptide-1 (GLP-1) is a gastrointestinal polypeptide hormone, which is mainly secreted by three kinds of human tissues: L cells at the distal end of intestine, α cells of the pancreas, and central nervous system (CNS). The proglucagon gene of GLP-1 is located on human chromosome 2. After transcription and translation, it is digested into oxyntomodulin (OXM), intervening peptide-1 (IP-1), GLP-1, GLP-2 by prohormone converting enzyme PC1/3 in L cells. Then GLP-1 is digested and degraded by DPP-4 or NEP-24.11, and finally excreted in the kidney. The effects of GLP-1 on the regulation of blood glucose mainly include: promoting insulin synthesis and secretion, delaying gastric emptying, inducing satiety, inhibiting glucagon secretion, and promoting the regeneration of pancreatic β cells, etc. GLP-1 exerts its effects by binding and activating a class B G protein-coupled receptor (GPCR) GLP-1R.

Under normal physiological conditions, its main physiological function is to stimulate pancreatic β cells to secrete insulin, inhibit pancreatic α cells to secrete glucagon, suppress appetite, and delay gastric emptying. More importantly, the effect of GLP-1 on promoting insulin secretion depends on the blood glucose concentration. In patients with type II diabetes, the GLP-1 functions of promoting insulin secretion and inhibiting glucagon secretion are impaired, but not completely disappeared, and can be repaired by GLP-1 at physiological or super-physiological concentration. Continuous injection of GLP-1 to patients with type 2 diabetes can improve the glycemic control and reduce weight. Therefore, GLP-1 is a good drug target for the treatment of type II diabetes.

The GLP-1 receptor agonists that have been approved by the FDA for marketing include early short-acting agonists: exenatide (administered twice a day), liraglutide, lixisenatide (administered once a day), and recent long-acting agonists (administered once a week): exenatide microspheres, albiglutide, dulaglutide and semaglutide. Among them, dulaglutide extends the half-life of GLP-1 in the blood by fusion expression of GLP-1 and the Fc terminal of human immunoglobulin IgG4. The half-life of IgG4 in vivo is about 21 days, however the half-life in vivo of the GLP-1-Fc fusion protein drug on the market (dulaglutide) is only 4.5-4.7 days. Dulaglutide exists in the form of a dimer with a monomer molecular weight of 29.8 kDa, and it is small enough to pass through the glomerular filtration membrane to accelerate its elimination.

Glucagon

Glucagon is also converted from proglucagon, and it initiates the corresponding signaling pathway by binding and activating the glucagon receptor to regulate gluconeogenesis and glycogenolysis, thereby increasing blood glucose, which is opposite to the physiological effects of GLP-1. Glucagon receptor also belongs to type B GPCR, which is a seven-transmembrane-spanning protein, and its extracelluar domain (ECD) is the main domain that binds glucagon. Studies have shown that glucagon can suppress appetite, reduce food intake, and have the effects of degrading fat and reducing body weight.

GLP-1 Mutant Protein and Fusion Protein of the Present Invention

In the present invention, it provides a GLP-1 mutant protein and a fusion protein comprising the GLP-1 mutant protein.

As used herein, the terms "GLP-1 mutant protein", "GLP-1 variant", and "GLP-1 mutant polypeptide" are used interchangeably, and all refer to the GLP-1 mutant protein of the present invention which has both of the activity of binding and activating a class B G protein-coupled receptor GLP-1R, and the activity of binding a glucagon receptor.

Preferably, the GLP-1 mutant protein of the present invention has the amino acid sequence shown in SEQ ID NO: 7, 8 or 9.

As used herein, the terms "fusion protein", "fusion protein of the present invention", and "Fc fusion protein" are used interchangeably and refer to a fusion protein comprising the GLP-1 mutant protein of the present invention and an Fc region, and it has both of the activity of binding and activating a class B G protein-coupled receptor GLP-1R, and the activity of binding a glucagon receptor.

Preferably, the fusion protein of the present invention has the amino acid sequence shown in SEQ ID NO: 12, 13 or 14.

As used herein, the term "GLP-1 mutant protein" or "fusion protein" also includes variant forms with the above-mentioned activities. These variant forms include (but are not limited to): deletion, insertion and/or substitution of 1-3 (usually 1-2, more preferably 1) amino acids, and addition or deletion of one or several (usually within 3, preferably within 2, more preferably within 1) amino acids at the C-terminus and/or N-terminus. For example, in this art, substitution with amino acids with similar or close properties usually does not alter the function of a protein. For another example, addition or deletion of one or several amino acids at the C-terminus and/or N-terminus usually also does not alter the structure and function of a protein. In addition, the term also includes the polypeptides of the present invention in monomeric and multimeric forms. The term also includes linear and non-linear polypeptides (such as cyclic peptides).

Active fragments, derivatives and analogs of the above-mentioned GLP-1 mutant protein or fusion protein are also included in the present invention. As used herein, the terms "fragment", "derivative" and "analog" refer to a polypeptide that substantially retains the function or activity of the GLP-1 mutant protein or fusion protein of the present invention. The polypeptide fragment, derivative or analog of the present invention can be (i) a polypeptide with substitution of one or several conservative or non-conservative amino acid residues (preferably conservative amino acid residues), or (ii) a polypeptide with a substitution group in one or more amino acid residues, or (iii) a polypeptide formed by fusion of the polypeptide with another compound (such as a compound that extends the half-life of the polypeptide, such as polyethylene glycol), or (iv) a polypeptide formed by fusion of an additional amino acid sequence with this polypeptide sequence (a fusion protein formed by fusion with a leader sequence, a secretion sequence, or a tag sequence such as 6His). According to the teachings herein, these fragments, derivatives and analogs belong to the scope well known to those skilled in the art.

A preferred type of the active derivative refers to a polypeptide formed by substitution of at most 3, preferably at most 2, and more preferably at most 1 amino acids with an amino acid having similar or close properties, compared with the amino acid sequence of the present invention. These conservative variant polypeptides are preferably produced by the amino acid substitution according to Table A.

TABLE A

| Initial Residue | Representative Substitution | Preferred Substitution |
| --- | --- | --- |
| Ala (A) | Val; Leu; Ile | Val |
| Arg (R) | Lys; Gln; Asn | Lys |
| Asn (N) | Gln; His; Lys; Arg | Gln |
| Asp (D) | Glu | Glu |
| Cys (C) | Ser | Ser |
| Gln (Q) | Asn | Asn |
| Glu (E) | Asp | Asp |
| Gly (G) | Pro; Ala | Ala |
| His (H) | Asn; Gln; Lys; Arg | Arg |
| Ile (I) | Leu; Val; Met; Ala; Phe | Leu |
| Leu (L) | Ile; Val; Met; Ala; Phe | Ile |
| Lys (K) | Arg; Gln; Asn | Arg |
| Met (M) | Leu; Phe; Ile | Leu |
| Phe (F) | Leu; Val; Ile; Ala; Tyr | Leu |
| Pro (P) | Ala | Ala |
| Ser (S) | Thr | Thr |
| Thr (T) | Ser | Ser |
| Trp (W) | Tyr; Phe | Tyr |
| Tyr (Y) | Trp; Phe; Thr; Ser | Phe |
| Val (V) | Ile; Leu; Met; Phe; Ala | Leu |

Analogs of the fusion protein of the present invention are also provided in the present invention. The difference between these analogs and the polypeptide of the present invention may be the difference in amino acid sequences, the difference in modification form that does not affect the sequence, or both. The analog also includes an analog with residues different from natural L-amino acids (such as D-amino acids), and an analog with non-naturally occurring or synthetic amino acids (such as β, γ-amino acids). It should be understood that the polypeptide of the present invention is not limited to the representative polypeptide exemplified above.

In addition, the GLP-1 mutant protein or fusion protein of the present invention can also be modified. Modification (usually without altering the primary structure) forms include: a chemically derived form of a polypeptide in vivo or in vitro, such as acetylation or carboxylation. The modification also includes glycosylation, such as those polypeptides produced by glycosylation modification during the synthesis and processing of the polypeptide or during further processing steps. This modification can be accomplished by exposing the polypeptide to an enzyme for glycosylation (such as a mammalian glycosylase or deglycosylase). Modification forms also include a sequence with phosphorylated amino acid residues (e.g., phosphotyrosine, phosphoserine, phosphothreonine). A polypeptide that has been modified thereby improving its resistance to proteolysis or optimizing its solubility, is also included.

The term "polynucleotide of the present invention" may include a polynucleotide encoding the GLP-1 mutant protein or fusion protein of the present invention, or may also include a polynucleotide of an additional encoding and/or non-encoding sequence.

A variant of the aforementioned polynucleotide, which encodes a fragment, analog and derivative of the polypeptide or fusion protein with the same amino acid sequence as the present invention, is also related to the present invention. These nucleotide variants include substitution variants, deletion variants and insertion variants. As known in the art, an allelic variant is an alternative form of a polynucleotide, which may be a substitution, deletion or insertion of one or more nucleotides, but will not substantially alter the function of the GLP-1 mutant protein or fusion protein it encodes.

A polynucleotide that hybridizes with the aforementioned sequence and has at least 50%, preferably at least 70%, and more preferably at least 80% identity between the two sequences, is also related to the present invention. A polynucleotide that can hybridize with the polynucleotide of the present invention under strict conditions (or stringent conditions) is particularly related to the present invention. In the present invention, "strict conditions" refer to: (1) hybridization and elution at lower ionic strength and higher temperature, such as 0.2×SSC, 0.1% SDS, 60° C.; or (2) a denaturant is added during hybridization, such as 50% (v/v) formamide, 0.1% calf serum/0.1% Ficoll, 42° C., etc.; or (3) the hybridization occurs only when the identity between two sequences is at least more than 90%, preferably more than 95%.

The GLP-1 mutant protein or fusion protein and polynucleotide of the present invention are preferably provided in an isolated form, and more preferably, are purified to homogeneity.

The full-length sequence of the polynucleotide of the present invention can usually be obtained by PCR amplification method, recombination method or artificial synthesis method. For the PCR amplification method, primers can be designed according to the relevant nucleotide sequence disclosed in the present invention, especially the open reading frame sequence, and a commercially available cDNA library or a cDNA library prepared by a conventional method known to those skilled in the art can be used as a template to amplify the relevant sequence. When the sequence is long, two or more PCR amplifications are often necessary to be performed, and then the amplified fragments are spliced together in the correct order.

Once the relevant sequence is obtained, the recombination method can be used to obtain the relevant sequence in large quantities. This method is usually done by cloning the relevant sequence into a vector, then transferring the vector into a cell, and then isolating and obtaining the relevant sequence from the proliferated host cell by conventional methods.

In addition, the artificial synthesis method can also be used to synthesize the related sequence, especially when the fragment length is short. Typically, a fragment with a very long sequence can be obtained by first synthesizing multiple small fragments, and then ligating them.

At present, a DNA sequence encoding the present invention (or fragment or derivative thereof) of the present invention can be obtained completely through chemical synthesis. The DNA sequence can then be introduced into various existing DNA molecules (or such as vectors) and cells known in the art.

The method of using PCR technology to amplify DNA/RNA is preferably used to obtain the polynucleotide of the present invention. Especially when it is difficult to obtain full-length cDNA from the library, the RACE method (RACE-rapid amplification of cDNA ends method) can be preferably used. The primers used for PCR can be appropriately selected according to the sequence information of the present invention disclosed herein, and can be synthesized by conventional methods. The amplified DNA/RNA fragments can be separated and purified by conventional methods such as gel electrophoresis.

Expression Vector

A vector comprising the polynucleotide of the present invention, and a host cell produced by genetic engineering using the vector of the present invention or an encoding sequence of the GLP-1 mutant protein or fusion protein of the present invention, and a method for producing the polypeptide of the present invention through recombinant technology, are also related to the present invention.

Through conventional recombinant DNA technology, the polynucleotide sequence of the present invention can be used to express or produce a recombinant fusion protein. Generally, the following steps are included:
 (1) transforming or transducing a suitable host cell by using the polynucleotide (or variant) of the present invention encoding the fusion protein of the present invention, or using a recombinant expression vector comprising the polynucleotide;
 (2) culturing the host cell in a suitable medium;
 (3) separating and purifying the protein from the culture medium or cells.

In the present invention, the polynucleotide sequence encoding the fusion protein can be inserted into the recombinant expression vector. The term "recombinant expression vector" refers to bacterial plasmids, bacteriophages, yeast plasmids, plant cell viruses, and mammalian cell viruses such as adenovirus, retrovirus or other vectors well known in the art. Any plasmid and vector can be used as long as it can be replicated and stabilized in the host. An important feature of an expression vector is that it usually comprises an origin of replication, a promoter, a marker gene, and a translation control element.

Methods well known to those skilled in the art can be used to construct an expression vector comprising a DNA encoding sequence of the fusion protein of the present invention and an appropriate transcription/translation control signal. These methods include in vitro recombinant DNA technology, DNA synthesis technology, and in vivo recombination technology, etc. The DNA sequence can be effectively linked to an appropriate promoter in the expression vector to guide mRNA synthesis. Representative examples of these promoters are: lac or trp promoter of *Escherichia coli*; λ phage PL promoter; eukaryotic promoters include CMV immediate early promoter, HSV thymidine kinase promoter, early and late SV40 promoter, LTRs of retroviruses and some other known promoters which can control the gene expression in prokaryotic or eukaryotic cells or viruses. The expression vector also includes a ribosome binding site for translation initiation and a transcription terminator.

In addition, the expression vector preferably comprises one or more selectable marker genes to provide phenotypic traits for selection of transformed host cells, such as dihydrofolate reductase, neomycin resistance, and green fluorescent protein (GFP) for eukaryotic cell culture, or tetracycline or ampicillin resistance for *Escherichia coli*.

A vector comprising the above-mentioned appropriate DNA sequence and an appropriate promoter or control sequence can be used to transform an appropriate host cell so that it can express a protein.

The host cell can be a prokaryotic cell, such as a bacterial cell; or a lower eukaryotic cell, such as a yeast cell; or a higher eukaryotic cell, such as a mammalian cell. Representative examples include: *Escherichia coli, Streptomyces*; bacterial cells of *Salmonella typhimurium*; fungal cells such as yeast and plant cells (such as *ginseng* cells).

When the polynucleotide of the present invention is expressed in higher eukaryotic cells, if an enhancer sequence is inserted into the vector, the transcription will be enhanced. Enhancers are cis-acting factors of DNA, usually with about 10 to 300 base pairs, acting on promoters to enhance gene transcription. Examples that can be enumerated include the SV40 enhancer with 100 to 270 base pairs on the late side of the replication origin, the polyoma enhancer on the late side of the replication origin, and the adenovirus enhancer, etc.

Those of ordinary skill in the art know how to select appropriate vectors, promoters, enhancers and host cells.

Transformation of a host cell with a recombinant DNA can be carried out by conventional techniques well known to those skilled in the art. When the host is a prokaryotic organism such as Escherichia coli, competent cells that can absorb DNA can be harvested after the exponential growth phase then treated with the $CaCl_2$) method, and the steps used are well known in the art. Another method is to use $MgCl_2$. If necessary, the transformation can also be carried out by electroporation. When the host is a eukaryote, the following DNA transfection methods can be selected: calcium phosphate co-precipitation method, conventional mechanical methods such as microinjection, electroporation, liposome packaging, etc.

The obtained transformants can be cultured by conventional methods to express the polypeptide encoded by the gene of the present invention. Depending on the host cell used, the medium used during the culture can be selected from various conventional mediums. The culture is carried out under conditions suitable for the growth of the host cell. When the host cell has grown to an appropriate cell density, a suitable method (such as temperature conversion or chemical induction) is used to induce the selected promoter, and the cell is cultured for another period of time.

The recombinant polypeptide of the above method can be expressed in the cell or on the cell membrane, or secreted out of the cell. If necessary, the physical, chemical, and other characteristics can be used to separate and purify the recombinant protein through various separation methods. These methods are well known to those skilled in the art. Examples of these methods include, but are not limited to: conventional renaturation treatment, treatment with protein precipitation agent (salting out method), centrifugation, osmotic shock method, ultra-treatment, ultra-centrifugation, molecular sieve chromatography (gel filtration), adsorption chromatography, ion exchange chromatography, high performance liquid chromatography (HPLC) and various other liquid chromatography techniques and combinations of these methods.

Fmoc Modification

In the field of biomedicine, peptides are becoming more and more useful. Amino acids are the basic raw materials for synthetic peptide technology. All amino acids contain α-amino groups and carboxyl groups, and some also contain side-chain active groups, such as hydroxyl groups, amino groups, guanidine groups and heterocycles, etc. Therefore, amino groups and side chain active groups need to be protected in the peptide formation reaction. After the peptide is synthesized, the protecting groups are removed, otherwise misconnection of amino acids and many side reactions will occur.

Fluorenylmethyloxycarbonyl (Fmoc) is a base-sensitive protecting groups, which can be deprotected in concentrated ammonia or dioxane-methanol-4N Na OH (30:9:1), and 50% dichloromethane solution of piperidine, ethanolamine, cyclohexylamine, 1,4-dioxane, pyrrolidone and other ammonia.

Under weak alkaline conditions such as sodium carbonate or sodium bicarbonate, Fmoc-Cl or Fmoc-OSu is generally used to introduce an Fmoc protecting group. Compared with Fmoc-Cl, reaction conditions can be easily controlled by using Fmoc-OSu and there are fewer side reactions. Under acidic conditions, the Fmoc protecting group is particularly stable, but it is very sensitive to alkaline conditions, so it is usually used together with the acid-sensitive protecting group Boc or Z to protect amino acids comprising side chain active groups.

Fmoc has strong ultraviolet absorption, the maximum absorption wavelength is 267 nm (ε18950), 290 nm (ε5280), or 301 nm (ε6200), so it can be detected by ultraviolet absorption, which brings a lot of convenience to the automatic peptide synthesis by instruments. Furthermore, it is compatible with a wide range of solvents and reagents, has high mechanical stability, and can be used with multiple carriers and multiple activation methods. Therefore, the Fmoc protecting group is currently the most commonly used protecting group in peptide synthesis.

Fmoc-OSu (N-(9-Fluorenylmethoxycarbonyloxy)succinimide)

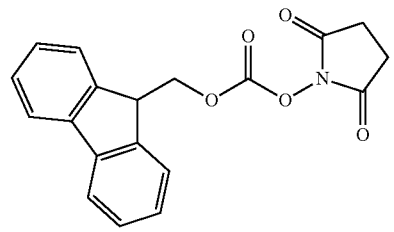

Liraglutide Side Chain

Pal-Glu-(OSu)-OtBu is Nα-Palmitoyl-(D)-glutamic acid-γ-succinimidyl-A-tert-butyl ester, briefly referred to as D type-liraglutide side chain.

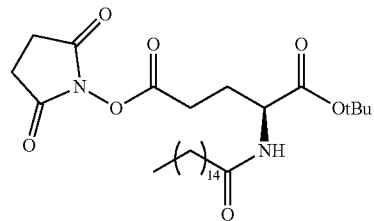

Pal-Glu-(OSu)-OtBu

Liraglutide is prepared by first using gene recombination technology to obtain a liraglutide backbone with a Boc-protected lysine at position 20, namely the $Arg^{34}GLP-1(7-37)$ sequence, and then linking the liraglutide side chain Pal-Glu-(OSu)-OtBu to obtain the liraglutide.

Main advantages of the present invention include:
1) The compound of the present invention is an Fc fusion protein of the Exendin-4 analog, which has dual activities of GLP-1 and glucagon. It can effectively control blood glucose and reduce a small amount of body weight through the GLP-1 activity, and can also increase calorie consumption through the glucagon activity, thereby synergistically reducing body weight.
2) Compared with other fusion proteins, the fusion protein 1 of the present invention can reduce body weight more effectively, and the reduction of body weight plays a significant role in controlling the condition of patients with obesity-related diseases.

The present invention will be further illustrated below with reference to the specific examples. It should be understood that these examples are only to illustrate the invention, not to limit the scope of the invention. The experimental methods with no specific conditions described in the following examples are generally performed under the conventional conditions (e.g., the conditions described by Sambrook et al., Molecular Cloning: A Laboratory Manual (New York: Cold Spring Harbor Laboratory Press, 1989), or according to the manufacturer's instructions. Unless indicated otherwise, all percentage and parts are calculated by weight.

Example 1: Construction of Gene Library

According to the contribution of each amino acid of GLP-1 and glucagon wild-type sequences to the respective biological activities, GLP-1/glucagon dual agonists with different sequences were designed and formed into a combination. The amino acid sequence of this combination was the sequence shown as follows:

(SEQ ID NO: 1)
HX₁QGTFTSDX₂SKYLDEQX₃AX₄X₅FX₆X₇WLIAGGPSSGAPPPS wherein X1 is Gly or Ser,
X2 is Leu or Tyr,
X3 is Arg or Ala,
X4 is Lys or Gln,
X5 is Glu or Asp,
X6 is Ile or Val,
X7 is Ala or Gln.

The DNA expressing the following amino acid sequence was inserted into the pcDNA5/FRT vector. In the following DNA sequence, the underlined part was the signal peptide sequence (MELGLRWVFLVAILEGVQC, SEQ ID NO: 2), and the remaining part expressed the GLP-1/glucagon dual agonist (HGQGTFTSDLSKYLDEQRAKEFIAWL-IAGGPSSGAPPPS, SEQ ID NO: 3).

(SEQ ID NO: 4)
ATGGAGCTGGGCCTGAGGTGGGTGTTCCTGGTGGCCATCCTGGAGGGCG

TGCAGTGCCACGGCCAGGGCACCTTCACCAGCGACCTGAGCAAGTACCT

GGACGAGCAGAGGGCCAAGGAGTTCATCGCCTGGCTGATCGCCGGCGGC

CCCAGCAGCGGCGCCCCCCCCCCCAGC

The plasmid was named as pcDNA5/FRT-Template.

A pair of PCR amplification primers was designed for gene library, and the underlined parts were the amino acid diversity sites:

```
Library-F:
                                        (SEQ ID NO: 5)
GACGAGCAGRSGGCCMAGGASTTCRTHSMCTGG;

Library-R:
                                        (SEQ ID NO: 6)
CAGGTACTTGCTAWRGTCGCTGGTGAAGGTGCCCTGTYSGTG.
```

The plasmid pcDNA5/FRT-Template was used as a template, PCR amplification (PrimeSTAR® Max DNA Polymerase) was carried out with the above primers, and the DNA fragments were recovered by gel extraction. Blunting of DNA ends, 5'-end phosphorylation, and ligation of 3' and 5' ends of the DNA fragments were carried out with a kit (Blunting Kination Ligation (BKL) Kit). The ligated DNA fragments were transformed into competent cells DH5α, which were cultured in a 500 ml shake flask overnight (LB medium, containing 100 μg/ml AMP). The plasmid was extracted in large quantities with the kit, and named as pcDNA5/FRT-Library, which was the constructed gene library.

Example 2: Transfection of Flp-In CHO Cells with Gene Library

The plasmid pcDNA5/FRT-Library and pOG plasmid were mixed at a ratio of 1:9, and the mixed plasmid was transfected into Flp-In CHO cells with the transfection reagent Lipofectamine2000. After 24 h, passage cultivation was carried out in a medium containing 500 μg/ml hygromycin.

After the cell viability returned to a stable state, the cells were diluted and plated into a 96-well plate. A total of 20 96-well plates were plated, with a cell density of 0.4 average cell density/well, and with a volume of 200 μl. The 96-well plates were placed in a constant temperature $CO_2$ incubator for 16 days.

Example 3: Activity Detection of Monoclonal Cells in Supernatant

The formation of monoclonal cells was observed under a microscope, and the wells where the monoclonal cells were formed were labeled. 100 μl of the supernatant was taken out from the respective wells and diluted with culture medium twice.

CHO-K1 cells expressing human GLP-1 receptor and CRE-luciferase were used to detect the GLP-1 activity of the sample, and the positive control was 100 ng/ml GLP-1. CHO-K1 cells expressing human glucagon receptor and CRE-luciferase were used to detect the glucagon activity of the sample, and the positive control was 100 ng/ml glucagon. Clones with fluorescence values greater than those of both the two positive controls were selected.

TABLE 1

Test results of viability of the monoclonal cells

| Clone Number | % $RLU_{GLP-1}$ | % $RLU_{Glucagon}$ |
|---|---|---|
| 3D9 | 286 | 197 |
| 6B7 | 123 | 156 |
| 12C6 | 183 | 112 |

As can be seen from the results in Table 1, all the proteins expressed by the selected three clone cells had strong GLP-1 activity and glucagon activity.

Example 4: Gene Sequencing of Monoclonal Cells

After the clone cells were trypsinized in the 96-well plate, the cell DNA was extracted respectively with a kit. The extracted DNA was used as a PCR template, and the primers CMV-F and BGH PolyA reverse were used for PCR amplification. The amplified DNA fragments were purified, then sequenced and translated into amino acid sequences.

TABLE 2

Amino acid sequence corresponding to each clone

| Clone Number | Amino Acid Sequence | SEQ ID NO: |
|---|---|---|
| 3D9 | HSQGTFTSDYSKYLDEQAAKEFIAWLIAGGPSSGAPPPS | 7 |
| 6B7 | HSQGTFTSDYSKYLDEQRAKDFIAWLIAGGPSSGAPPPS | 8 |
| 12C6 | HSQGTFTSDYSKYLDEQRAKEFVAWLIAGGPSSGAPPPS | 9 |

Example 5: Preparation of Fc Fusion Protein Samples

Due to the shorter half-life and the higher frequency of administration of polypeptides, it is necessary to achieve long-acting effects in different ways. In this example, the polypeptides were fused with the Fc fragment (SEQ ID NO: 11) by the linker (SEQ ID NO: 10) to form the Fc fusion protein 1 (SEQ ID NO: 12), Fc fusion protein 2 (SEQ ID NO: 13) and Fc fusion protein 3 (SEQ ID NO: 14).

The corresponding genes were chemically synthesized according to the amino acid sequences and cloned into the pcDNA3.1 vector. A large amount of plasmids were extracted and transfected into ExpiCHO-S cells (Life Technologies). Feed and Enhancer were added after 24 hours of transfection, and the cells were cultured in a constant temperature shaking table under conditions of 5%, 120 rpm, and 32° C. After culturing for 7 days, the cell liquid was centrifuged (10000×g) for 30 min, and the supernatant obtained after centrifugation was filtered with a 0.45 μm filter.

The filtrate was loaded onto a Mab Select SuRe column equilibrated with phosphate buffer. The column was then eluted with 10 times the column bed volume of phosphate buffer, the bound fusion protein was eluted with 50 mmol/L citrate buffer (pH3.0), and then neutralized to pH 7.0 with 1 mol/L Tris-HCl solution.

The purity of the fusion protein was detected by HPLC-SEC, the absorbance value of the fusion protein at 280 nm was measured by an ultraviolet spectrophotometer, and the content of the fusion protein was calculated according to the extinction coefficient and purity of the fusion protein.

TABLE 3

Amino acid sequences related to the fusion proteins

| Name | Sequence | SEQ ID NO: |
|---|---|---|
| Linker sequence (linker) | GGGGGSGGGGSGGGGSA | 10 |
| Fc fragment | ESKYGPPCPPCPAPEAAGGPSVFLFPPKPKDTLMISRTPEVTCVVV DVSQEDPEVQFNWYVDGVEVHNAKTKPREEQFNSTYRVVSVLTV LHQDWLNGKEYKCKVSNKGLPSSIEKTISKAKGQPREPQVYTLPP SQEEMTKNQVSLTCLVKGFYPSDIAVEWESNGQPENNYKTTPPVL DSDGSFFLYSRLTVDKSRWQEGNVFSCSVMHEALHNHYTQKSLS LSLG | 11 |
| Fc fusion protein 1 | HSQGTFTSDYSKYLDEQAAKEFIAWLIAGGPSSGAPPPSGGGGGS GGGGSGGGGSAESKYGPPCPPCPAPEAAGGPSVFLFPPKPKDTLMI SRTPEVTCVVVDVSQEDPEVQFNWYVDGVEVHNAKTKPREEQFN STYRVVSVLTVLHQDWLNGKEYKCKVSNKGLPSSIEKTISKAKGQ PREPQVYTLPPSQEEMTKNQVSLTCLVKGFYPSDIAVEWESNGQP ENNYKTTPPVLDSDGSFFLYSRLTVDKSRWQEGNVFSCSVMHEA LHNHYTQKSLSLSLG | 12 |
| Fc fusion protein 2 | HSQGTFTSDYSKYLDEQRAKDFIAWLIAGGPSSGAPPPSGGGGGS GGGGSGGGGSAESKYGPPCPPCPAPEAAGGPSVFLFPPKPKDTLMI SRTPEVTCVVVDVSQEDPEVQFNWYVDGVEVHNAKTKPREEQFN STYRVVSVLTVLHQDWLNGKEYKCKVSNKGLPSSIEKTISKAKGQ PREPQVYTLPPSQEEMTKNQVSLTCLVKGFYPSDIAVEWESNGQP ENNYKTTPPVLDSDGSFFLYSRLTVDKSRWQEGNVFSCSVMHEA LHNHYTQKSLSLSLG | 13 |
| Fc fusion protein 3 | HSQGTFTSDYSKYLDEQRAKEFVAWLIAGGPSSGAPPPSGGGGGS GGGGSGGGGSAESKYGPPCPPCPAPEAAGGPSVFLFPPKPKDTLMI SRTPEVTCVVVDVSQEDPEVQFNWYVDGVEVHNAKTKPREEQFN STYRVVSVLTVLHQDWLNGKEYKCKVSNKGLPSSIEKTISKAKGQ PREPQVYTLPPSQEEMTKNQVSLTCLVKGFYPSDIAVEWESNGQP ENNYKTTPPVLDSDGSFFLYSRLTVDKSRWQEGNVFSCSVMHEA LHNHYTQKSLSLSLG | 14 |

Example 6: Determination of In Vitro Biological Activity of Fusion Proteins

CHO-K1 cells expressing human GLP-1 receptor and CRE-luciferase were used to detect the in vitro GLP-1 activity of the fusion proteins. The cells were inoculated in a 96-well plate at a density of 50,000 cells/well/100 μL, and cultured at 5% $CO_2$, 37° C. for 1 hour.

For each protein sample to be tested, the protein solution was diluted 9 times with a 4-fold gradient from a concentration of 15 nmol/L, so that 10 dilutions of each sample of different concentrations were obtained. 50 μL of different dilutions was taken out and added into the 96-well plate inoculated with cells, and the 96-well plate was incubated at 5% $CO_2$, 37° C. for 5 hours.

The 96-well plate was taken out from the incubator and placed at room temperature for 10 minutes of equilibration, and 100 μL of reaction solution was added into each well. After the 96-well plate was shaken at 200 rpm for 10 minutes, the fluorescence reading of each well was detected by a multi-function microplate reader. Using the sample concentration as the abscissa and the fluorescence reading as the ordinate, a curve was drawn and the median effective concentration (EC50) of each sample was calculated. The results are shown in Table 4.

TABLE 4

Test results of in vitro biological activity of fusion proteins

| Sample | EC50 human GLP-1R (nmol/L) | EC50 human glucagon-R (nmol/L) |
|---|---|---|
| GLP-1 | 0.45 | >1000000 |
| Glucagon | 15 | 0.12 |
| Fc fusion protein 1 | 0.57 | 0.32 |
| Fc fusion protein 2 | 1.23 | 0.59 |
| Fc fusion protein 3 | 3.49 | 0.63 |

Example 7: Purity Detection of Fusion Proteins

In this example, the purity of the Fc fusion protein 1 was detected by capillary electrophoresis.

The fusion protein was diluted to 1 mg/mL, and 95 μL of the diluted protein solution was taken out to be mixed evenly with 5 μL of 0.8 mol/L iodoacetamide aqueous solution, thereby obtaining a non-reduced test sample. 95 μL of the diluted protein solution was taken out to be mixed evenly with 5 μL of 20 mercaptoethanol solution, thereby obtaining a reduced test sample.

The purities of non-reduced and reduced samples were detected by capillary electrophoresis. As shown in FIG. 1, the purity of non-reduced CE-SDS was 98.0%, and the purity of reduced CE-SDS was 95.4%.

Example 8: Experiments on Body Weight Reduction by Administration of Multiple Subcutaneous Injections in DIO Mice In this example, the effect of subcutaneous injection of the Fc fusion protein 1 on the body weight of DIO mice was studied, and the efficacy was compared with dulaglutide and semaglutide.

7-week-old C57BL/6Nju mice were fed with a high-fat diet (of about 20% protein and about 60% fat) for 12 weeks for modeling. Feeding conditions: 12 hours of light and 12 hours of darkness every day, ad libitum to feed and water, temperature 20-25° C., relative humidity 40-70%, ventilation frequency 10-15 times/hour.

According to body weight, water consumption, and food intake, the mice were randomly divided into groups the day before administration. Group design: 30 nmol/kg dulaglutide group, 30 nmol/kg semaglutide group, high dose (30 nmol/kg) group and low dose (10 nmol/kg) group of the same test sample, normal control group, model control group. A total of 6 groups with 6 mice in each group.

The subcutaneous injection was conducted as follows: the model control group and the normal control group were administrated with 0.05 ml/10 g body weight of PBS, twice a week for 4 consecutive weeks, a total of 8 times of administration. The body weight, food intake, and water consumption of mice were monitored regularly.

After the administration, the animals were dissected, and the liver, kidney, pancreas, inguinal fat, subcutaneous fat, scapular fat, perirenal fat, mesenteric adipose, and epididymal fat were separated and weighed. The data were shown as mean±standard error (X±s), and statistically analyzed by Student-t test.

Figure 2:
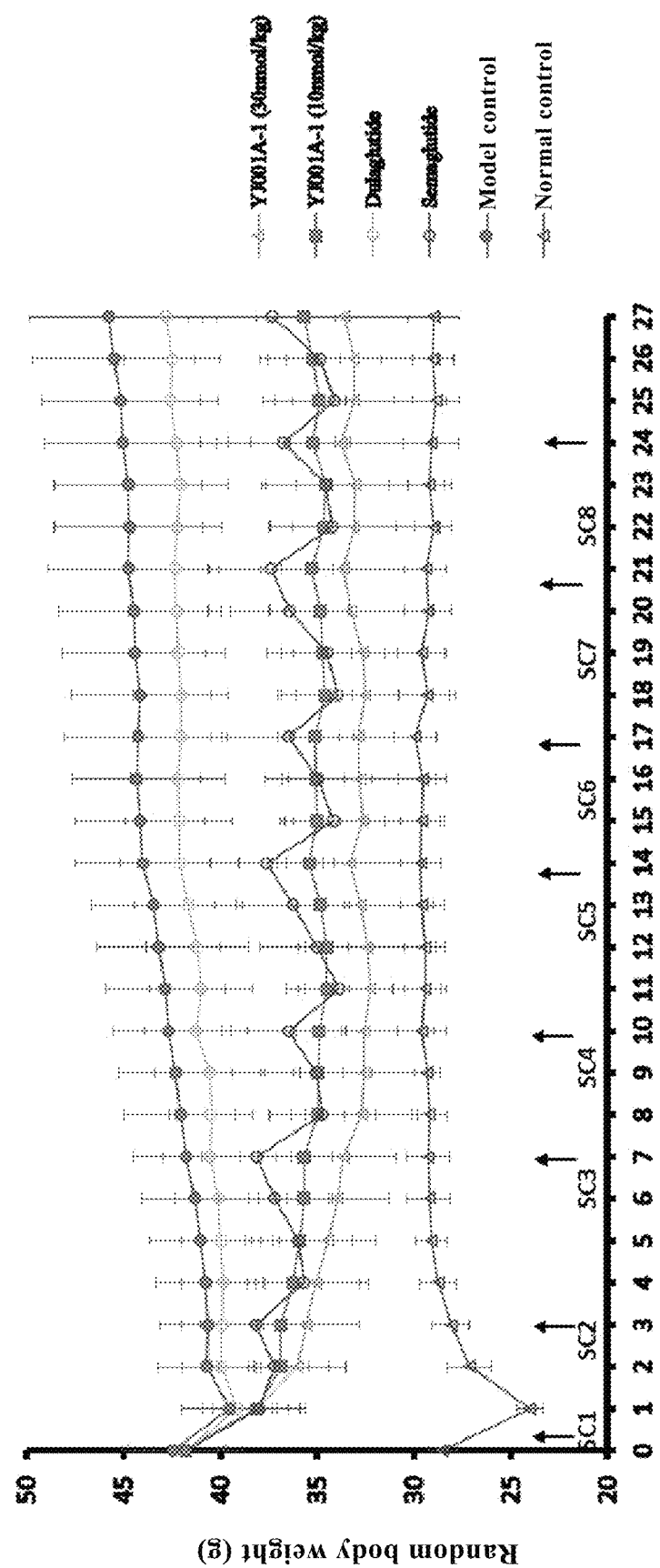
Figure 3:
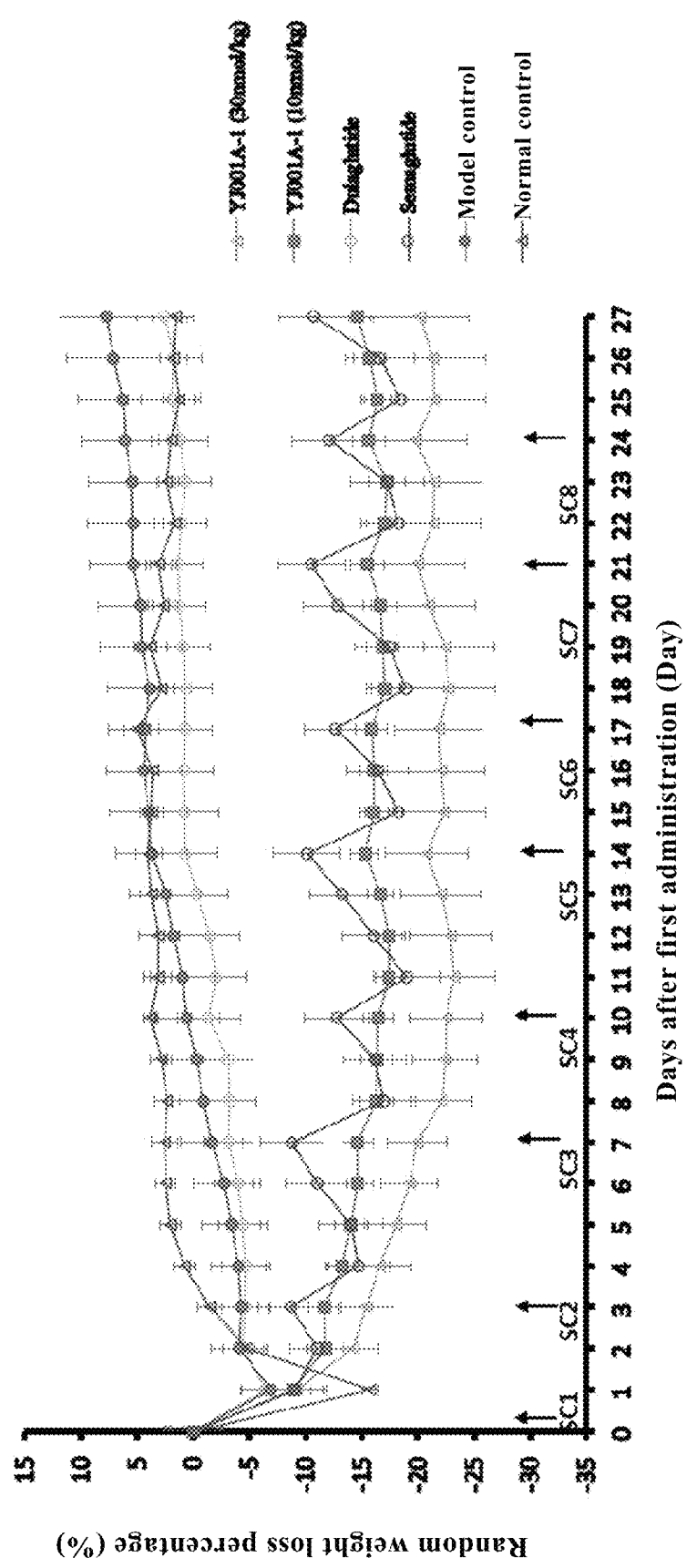
Figure 4:
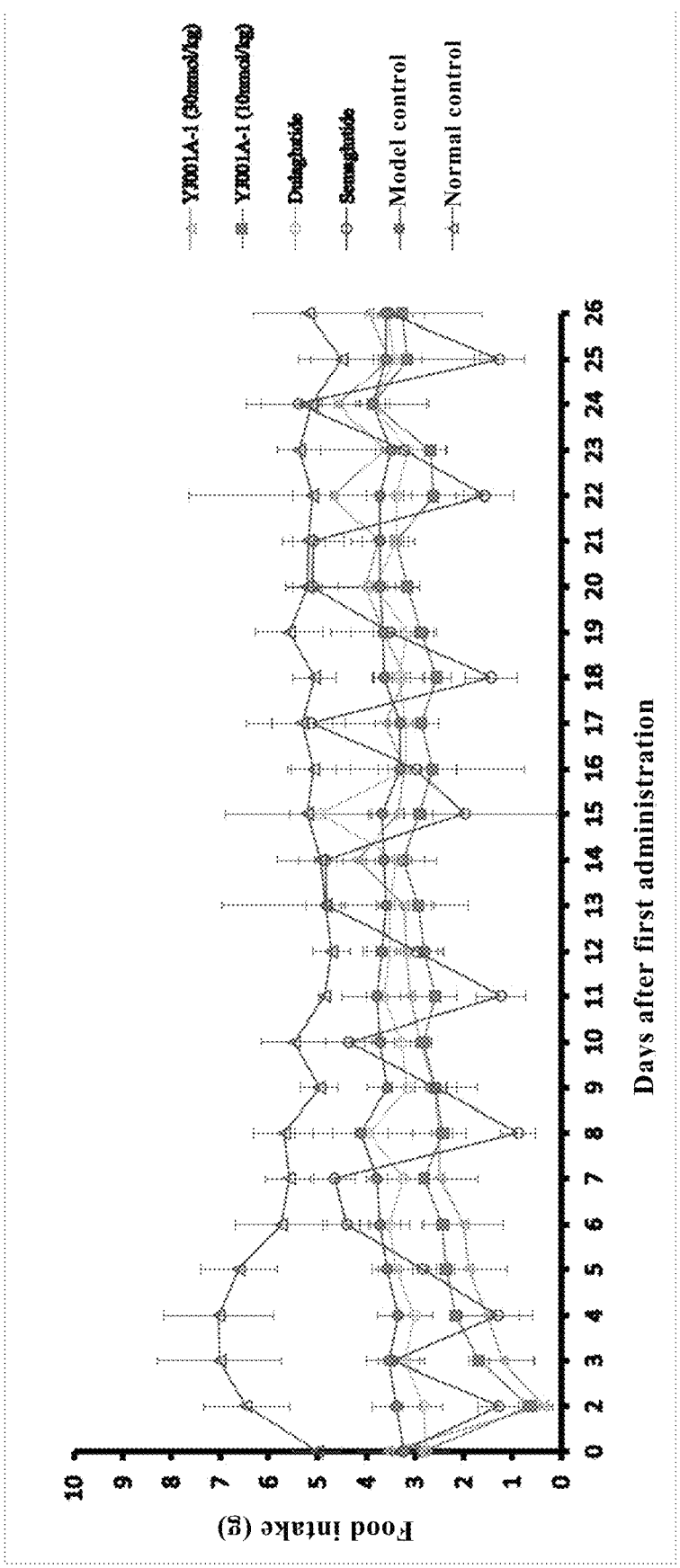
Figure 5:
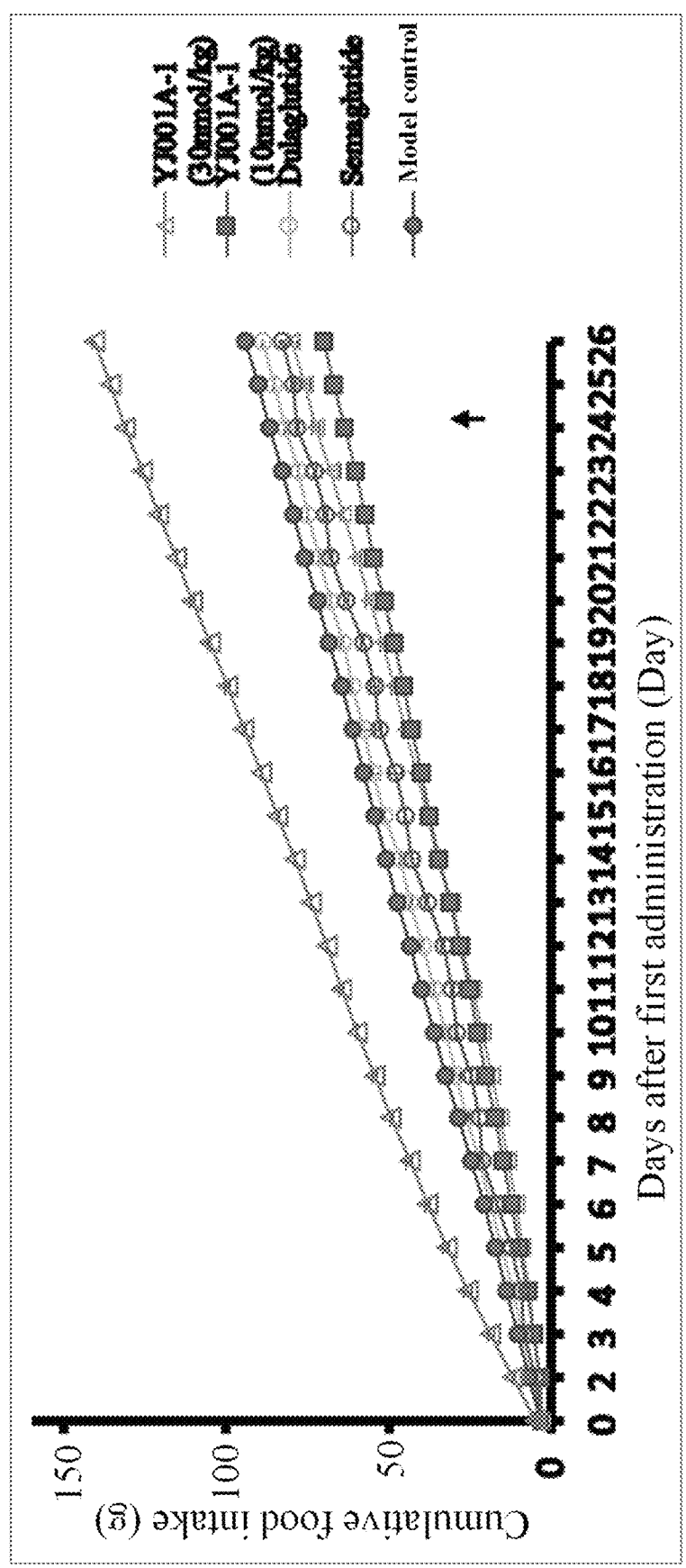
FIG. 5 shows the effect of repeated administration of the test substance and the control drug on the cumulative food intake of DIO mice.
Figure 6:
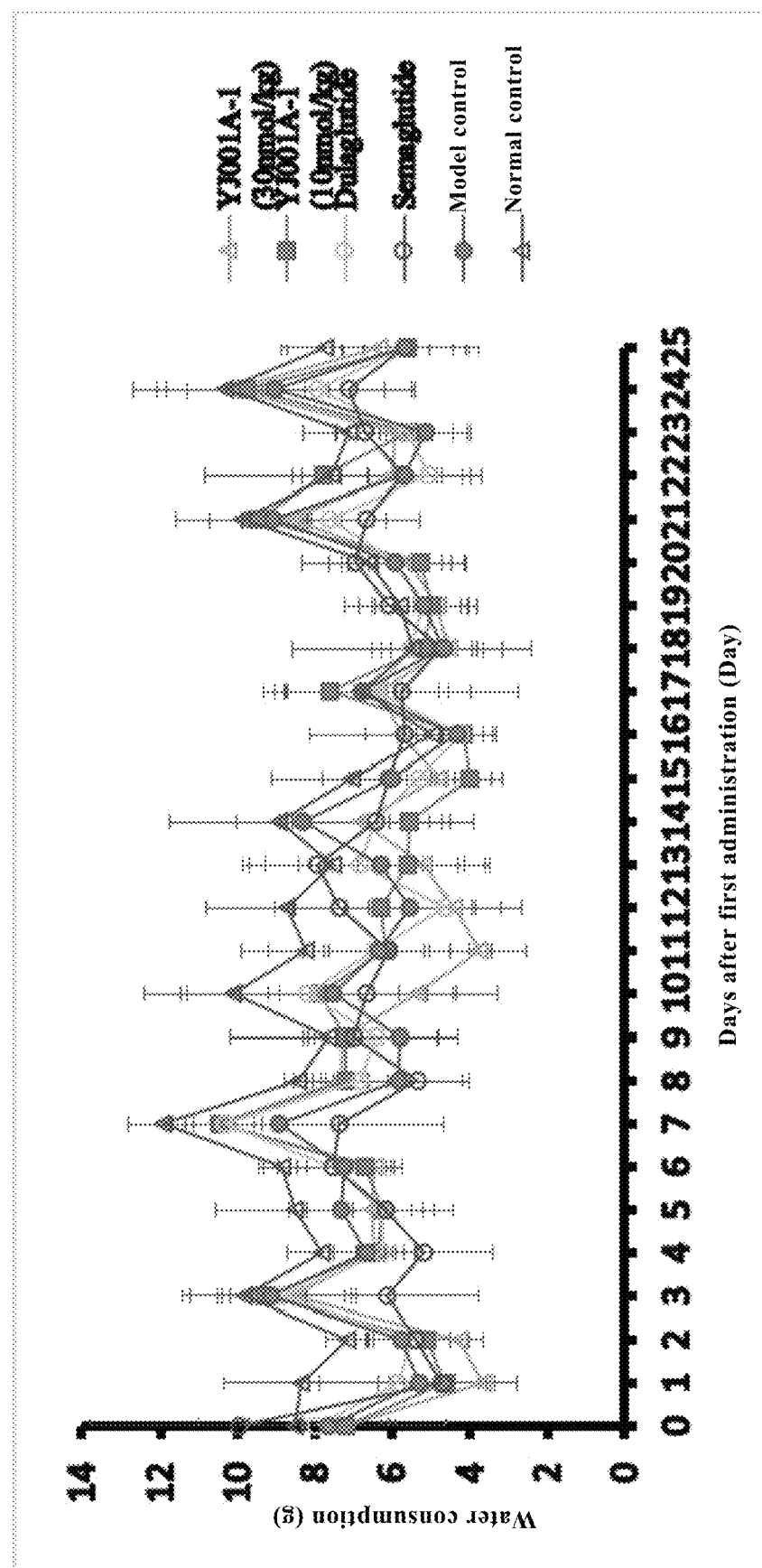
FIG. 6 shows the effect of repeated administration of the test substance and the control drug on the water intake of DIO mice.
Figure 7:
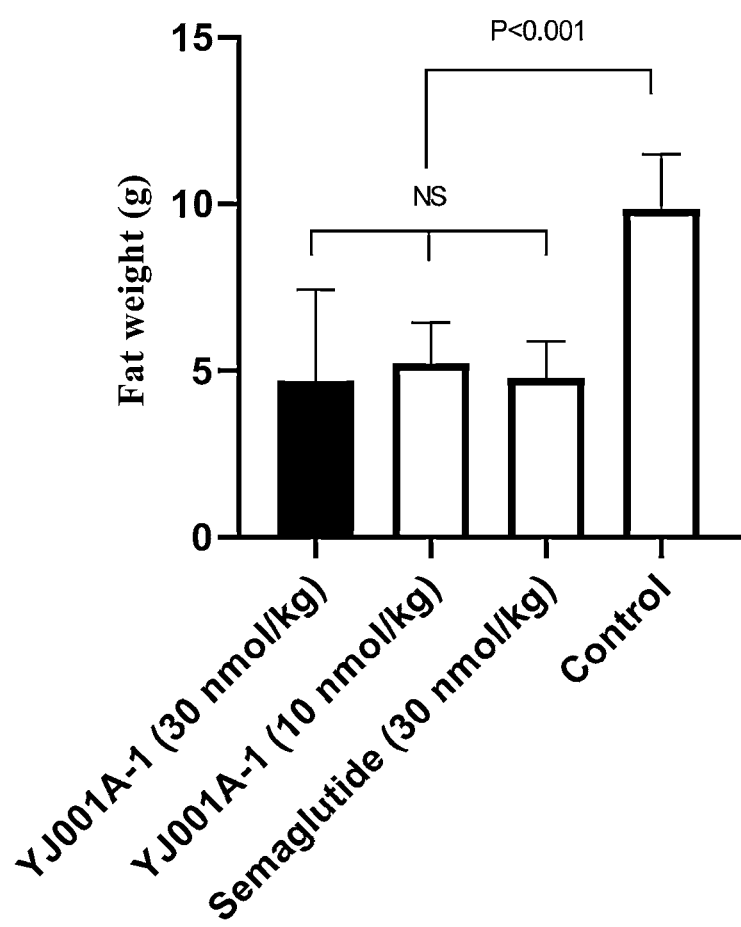
FIG. 7 shows the effect of repeated administration of the test substance and the control drug on the fat weight of DIO mice.

Among them, the results of weight change were shown in FIGS. 2 and 3. The weight reduction effect of the test sample YJ001A-1 at low doses was equivalent to that of the semaglutide high dose group, while the test sample YJ001A-1 at high doses had significantly better weight reduction effects than those of the same dose of semaglutide; the results of changes in food intake were shown in FIG. 4; and the results of cumulative food intake were shown in FIG. 5. The test sample YJ001A-1 could reduce the food intakes of mice at different doses, and the food intakes were all fewer than those of the semaglutide group; the results of water consumption were shown in FIG. 6; and the results of fat changes were shown in FIG. 7. The test sample YJ001A-1 could significantly reduce the fat mass of DIO mice, and the effect was equivalent to semaglutide.

All documents mentioned in the present invention are incorporated by reference herein as if each document was incorporated separately by reference. Furthermore, it should be understood that after reading the foregoing teachings of the present invention, various changes or modifications can be made to the present invention by those skilled in the art and that these equivalents also fall in the scope of the claims appended to this application.

The invention claimed is:

1. A glucagon-like peptide-1 (GLP-1) mutant protein, wherein the amino acid sequence of the GLP-1 mutant protein comprises the amino acid sequence of any one of SEQ ID NOs: 7, 8, and 9
and wherein the GLP-1 mutant protein has both of the activity of binding and activating a class B G protein-coupled receptor GLP-1R, and the activity of binding a glucagon receptor.

2. A fusion protein, wherein the fusion protein has a structure as shown in formula II from N-terminus to C-terminus, A-B-C-D    (formula II)

wherein,
A is absent or a signal peptide;
B is the GLP-1 mutant protein of claim 1;
C is a linker peptide;
D is a Fc fragment;
"-" is a peptide bond.

3. The fusion protein of claim 2, wherein the fusion protein has an amino acid sequence selected from the group consisting of
a sequence shown in SEQ ID NOs: 12, 13 or 14;
and wherein the fusion protein has both of the activity of binding and activating a class B G protein-coupled receptor GLP-1R, and the activity of binding a glucagon receptor.

4. An isolated polynucleotide encoding the GLP-1 mutant protein of claim 1 or a fusion protein,
wherein the fusion protein has a structure as shown in formula II from N-terminus to C-terminus, A-B-C-D    (formula II)

wherein,
A is absent or a signal peptide;
B is the GLP-1 mutant protein of claim 1;
C is a linker peptide;
D is a Fc fragment;
"-" is a peptide bond.

5. A vector comprising the polynucleotide of claim 4.

6. A host cell which expresses the GLP-1 mutant protein of claim 1 or a fusion protein,
wherein the fusion protein has a structure as shown in formula II from N-terminus to C-terminus, A-B-C-D    (formula II)

wherein,
A is absent or a signal peptide;
B is the GLP-1 mutant protein of claim 1;
C is a linker peptide;
D is a Fc fragment;
"-" is a peptide bond.

7. A method for preparing the GLP-1 mutant protein of claim 1 or a fusion protein, which comprises the following steps:
(i) culturing a host cell expressing the GLP-1 mutant protein of claim 1 or culturing a host cell expressing a fusion protein under suitable conditions to obtain a mixture comprising the GLP-1 mutant protein of claim 1 or the fusion protein; and
(ii) purifying and/or separating the mixture obtained in step (i), thereby obtaining the GLP-1 mutant protein of claim 1 or the fusion protein,
wherein the fusion protein has a structure as shown in formula II from N-terminus to C-terminus, A-B-C-D    (formula II)

wherein,
A is absent or a signal peptide;
B is the GLP-1 mutant protein of claim 1;
C is a linker peptide;
D is a Fc fragment;
"-" is a peptide bond.

8. A pharmaceutical composition comprising:
(I) the GLP-1 mutant protein of claim 1, or a fusion protein,
wherein the fusion protein has a structure as shown in formula II from N-terminus to C-terminus, A-B-C-D    (formula II)

wherein,
A is absent or a signal peptide;
B is the GLP-1 mutant protein of claim 1;
C is a linker peptide;
D is a Fc fragment;
"-" is a peptide bond; and
(II) a pharmaceutically acceptable carrier.

9. A method of reducing the body weight, or suppressing weight gain of a subject in need thereof, which comprises a step of administering an effective amount of the GLP-1 mutant protein of claim 1 or a fusion protein to the subject,
wherein the fusion protein has a structure as shown in formula II from N-terminus to C-terminus, A-B-C-D    (formula II)

wherein,
A is absent or a signal peptide;
B is the GLP-1 mutant protein of claim 1;
C is a linker peptide;
D is a Fc fragment;
"-" is a peptide bond.

* * * * *